United States Patent [19]
Laslo

[11] Patent Number: 5,779,999
[45] Date of Patent: Jul. 14, 1998

[54] METHOD FOR SCRUBBING FLUE GASES

[75] Inventor: Dennis J. Laslo, Lebanon, Pa.

[73] Assignee: Marsulex Environmental Technologies, LLC, Lebanon, Pa.

[21] Appl. No.: 807,010

[22] Filed: Feb. 27, 1997

Related U.S. Application Data

[62] Division of Ser. No. 580,693, Dec. 29, 1995, Pat. No. 5,665,317.

[51] Int. Cl.⁶ .................... B01D 53/40; B01D 53/78
[52] U.S. Cl. ............... 423/210; 423/240 R; 423/243.01
[58] Field of Search .................. 423/243.08, 243.06, 423/243.01, 240 R, 210; 422/227, 231

[56] References Cited

U.S. PATENT DOCUMENTS

| | | | |
|---|---|---|---|
| 3,795,486 | 3/1974 | Ekman | 23/283 |
| 4,294,807 | 10/1981 | Randolph | 423/242 |
| 4,366,132 | 12/1982 | Holter et al. | 423/242 |
| 4,632,810 | 12/1986 | Shinoda | 423/242 |
| 4,696,804 | 9/1987 | Shinoda | 423/242 |
| 5,094,824 | 3/1992 | Vankleeck | 423/224 |
| 5,213,782 | 5/1993 | Moser et al. | 423/243.1 |
| 5,308,509 | 5/1994 | Bhat et al. | 210/770 |
| 5,510,094 | 4/1996 | Bhat et al. | 423/243.07 |
| 5,512,072 | 4/1996 | Laslo | 55/250 |
| 5,665,317 | 9/1997 | Laslo | 422/171 |

FOREIGN PATENT DOCUMENTS

| | | |
|---|---|---|
| 0 363 009 A1 | 4/1990 | European Pat. Off. |
| 0 682 972 A2 | 11/1995 | European Pat. Off. |
| 31 36 155 A1 | 4/1982 | Germany |
| 54-25271 | 2/1979 | Japan |
| 2-293017 A | 12/1990 | Japan |
| 3-275122 A | 12/1991 | Japan |
| 6-39239 A | 2/1994 | Japan |
| WO 95/31272 | 11/1995 | WIPO |

*Primary Examiner*—Gary P. Straub
*Assistant Examiner*—Timothy C. Vanoy
*Attorney, Agent, or Firm*—Gary M. Hartman; Domenica N. S. Hartman

[57] ABSTRACT

A method for scrubbing flue gases utilizing a spray tower for removing acidic gases and particulate matter from flue gases produced by processing operations of the type carried out in utility and industrial facilities. The spray tower is equipped with a tank that serves as a reservoir for an alkaline slurry used to remove acidic gases and particulate matter from the flue gases. The slurry is pumped from the tank to spraying devices located within the tower. The spray tower further includes an internal structure that enables the slurry to be oxidized and gently agitated within a limited region of the tank, and without the requirement for two separate aeration and agitation devices. As a result, the construction, operational and maintenance costs of the spray tower are significantly reduced as compared to prior art spray towers.

7 Claims, 2 Drawing Sheets

METHOD FOR SCRUBBING FLUE GASES

This is a divisional of application Ser. No. 08/580,693 filed on 12/29/95 now U.S. Pat. No. 5,665,317.

This invention generally relates to gas-liquid contactors that use an alkaline slurry to remove acidic gases from utility and industrial combustion gases. More particularly, this invention is directed to a gas-liquid contactor having an improved tank configuration that achieves more efficient oxidization and agitation of the alkaline slurry.

BACKGROUND OF THE INVENTION

Absorbers are widely used to remove substances such as gases and particulate matter from combustion or flue gases produced by utility and industrial plants. Often of particular concern is sulfur dioxide ($SO_2$) and other acidic gases produced by the combustion of fossil fuels and various industrial operations. Such gases are known to be hazardous to the environment, and therefore their emission into the atmosphere is closely regulated by clean air statutes. Generally, these acidic gases are removed with spray towers or other types of gas-liquid contactors through the use of wet flue gas desulfurization (FGD) processes.

The cleansing action provided by gas-liquid contactors is generally derived from the passage of flue gases upwardly through a tower countercurrently to a descending liquid that cleans the air. Wet flue gas desulfurization processes typically involve the use of an alkaline cleansing liquid, such as a calcium-based slurry or a sodium-based or ammonia-based solution. As used herein, a slurry is a mixture of solids and liquids in which the content of the solids can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; CaO). Intimate contact between the alkaline liquid and acidic gases present in the flue gases, such as sulfur dioxide, hydrogen chloride (HCl) and hydrogen fluoride (HF), result in the absorption of the acidic gases by the slurry. Thereafter, the liquid is accumulated in a tank where the absorbed acidic gases are reacted to form precipitates that can be collected for disposal or recycling. For example, in a flue gas desulfurization process using a calcium-based slurry, the byproduct precipitate is gypsum ($CaSO_4$).

A known type of absorber 10 of the type using a spray tower 14 as a gas-liquid contactor is shown in FIG. 1. The spray tower 14 is generally an upright structure equipped with an inlet duct 12 through which flue gases enter the absorber 10. The inlet duct 12, as well as other appropriate sections of the tower 14, are preferably formed from a high nickel alloy to promote their corrosion resistance. Above the inlet duct 12 are banks 16 of spray headers 18 which introduce a spray of cleansing liquid, such as a calcium-based alkaline slurry, into the tower 14. Any number of banks 16 and spray headers 18 can be used as may be required for a given application. One or more pumps 26 are required to recycle the slurry to the spray headers 18 from a reservoir or tank 22 in which the slurry accumulates after contact with the flue gases. Each bank 16 of spray headers 18 may be individually equipped with a pump 26 to promote the flexibility of the pumping and spraying operation to accommodate varying demands by the scrubbing operation. After being "scrubbed," the flue gases are permitted to escape to the atmosphere through a mist eliminator 24 at an upper end of the tower 14.

Intimate contact between the slurry spray and the flue gases rising the tower 14 results in the acidic gases being absorbed by the slurry, which is then collected at the bottom of the tower 14 in the tank 22. As indicated in FIG. 1, the tank 22 conventionally requires an aerator 28 and one or more agitators 30. The aerator 28 injects an oxygen-containing gas, such as air, into the slurry accumulated in the tank 22 so that the slurry reacts with the absorbed acidic gases to form solid precipitates, such as gypsum if a calcium-based slurry is used, that can be safely recycled or disposed. The agitators 30 are required to continuously mix the slurry in order to maintain the alkali and solid precipitates in suspension. As shown, the tank 22 is equipped with an overflow 20 to limit the level of slurry in the tank 22, and is adapted to receive additional alkali 32 to compensate for that which has reacted with the acidic gases.

As is typical, the agitators 30 are shown as fans. Though this type of agitator is known to be effective, the gas bubbles generated by the aerator 28 are distributed throughout the slurry and lower its density, causing the slurry to occupy a considerable portion of the tower 14. From a structural standpoint, expansion of the slurry is disadvantageous because it necessitates that the height of the tower 14 be significantly greater than would be otherwise necessary to accommodate a suitable quantity of slurry. From an operational standpoint, the high speed of the fan blade tips causes secondary nucleation of solids, resulting in finer precipitates that are more difficult to remove from the tank 22 and more difficult to dewater and dry after removal. Further disadvantages with the use of fan agitators 30 are the occurrence of pump cavitation due to the intake of bubbles through the pump inlet 40 in the tank 22, and the energy and costs to operate and maintain the agitators 30.

Those skilled in the art will appreciate that, in view of the considerations noted above, it would be desirable to reduce construction, operational and maintenance costs that are attributable to the agitation of a slurry within the tank of a flue gas absorber.

SUMMARY OF THE INVENTION

It is an object of this invention to provide a flue gas scrubbing apparatus for the removal of acidic gases from flue gases produced by utility and industrial facilities.

It is another object of this invention that the apparatus employs an alkaline-based cleansing fluid for absorbing acidic gases from the flue gases, whereby oxidation of the cleansing fluid within an accumulation tank yields a precipitate that can be disposed of or recycled.

It is yet another object of this invention that the apparatus is equipped to agitate the cleansing fluid within the tank in a manner that ensures oxidation of the fluid while restricting agitation of the fluid to a relatively separate and limited region within the tank.

It is a further object of this invention to more fully and efficiently use the energy necessary to oxidize the cleansing fluid.

It is still a further object of this invention that the construction, operational and maintenance costs attributable to the agitation of the fluid within the tank are minimized.

The present invention provides a flue gas scrubbing apparatus for removing gases from flue gases produced by processing operations of the type carried out in utility and industrial plants. The apparatus is generally composed of a passage equipped with an inlet for introducing flue gases into the passage, and a tank that serves as a reservoir for a cleansing fluid, such as an alkaline slurry, that is used to remove acidic gases from the flue gases. The tank is equipped to deliver the fluid accumulated in the tank to devices that introduce the fluid into the passage, such that the fluid absorbs acidic gases within the flue gases. Thereafter, the fluid returns to the tank, which is further equipped with a device for injecting an oxygen-containing gas into the fluid. The injection of oxygen into the fluid causes the alkali to react with the acidic gases absorbed in the fluid from the flue gases. For example, in the case of desulfurization where an alkaline slurry of lime or limestone is used to absorb sulfur dioxide, oxygen or air is injected into the slurry to oxidize aqueous sulfite ($SO_3^-$) into sulfate ($SO_4^-$), the latter of which then reacts with calcium ions provided by the alkali to form gypsum.

According to this invention, the tank is further equipped with a partition that causes the fluid to circulate up through a first region delineated within the tank, and then down through a second region delineated within the tank, so as to agitate the alkali-containing fluid. More specifically, the partition operates in combination with the injector to agitate the fluid within the first region within the tank, and aids in the chemical reaction between the alkali and the acidic gases while maintaining the remaining alkali and resulting solid precipitates in suspension. Unique to this invention, agitation is not achieved with a fan, but instead relies on the agitation action achieved as the oxygen-containing gas is injected into the tank. The partition advantageously restricts frothing and expansion of the fluid within the first region, and therefore isolates the agitated fluid from the pump and any supplemental alkali added to the fluid.

According to the above, agitation and oxidation of the alkaline-containing fluid are combined into a single unit that efficiently performs both functions within the tank, and thereby yields significant advantages over the prior art. For example, agitation is far less rigorous than that of fan agitators of the prior art, yet has been found to achieve a desirable agitation level for the gas scrubbing operation. In addition, a more favorable environment for the reaction chemistry is achieved within the tank. For example, gentler agitation reduces the tendency for secondary nucleation of precipitates and promotes the formation of larger precipitate crystals that can be more readily dewatered, such that drying costs for the precipitates (e.g., gypsum) are reduced. Also reduced is the occurrence of sulfite binding of any alkali introduced directly into the tank, by which aqueous sulfite precipitates as calcium sulfite on the high pH surface of the alkali thereby lowering its dissolution rate and negatively affecting scrubber performance. Reduced sulfite binding is achieved because oxidation is restricted to a limited region of the tank away from the point at which additional alkali is introduced. If a pump is used to return the slurry to the passage, restricting agitation to a limited region within the tank also serves to isolate the pump from bubbles within the agitated fluid, thereby avoiding cavitation that can shorten the life of the pump. Furthermore, the combination of oxidization and agitation of the fluid with a single unit, rather than two or more separate devices as done in the prior art, reduces the construction, operational and maintenance costs of a gas-liquid contactor. In particular, the capital and operating costs of conventional agitator equipment are completely avoided.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
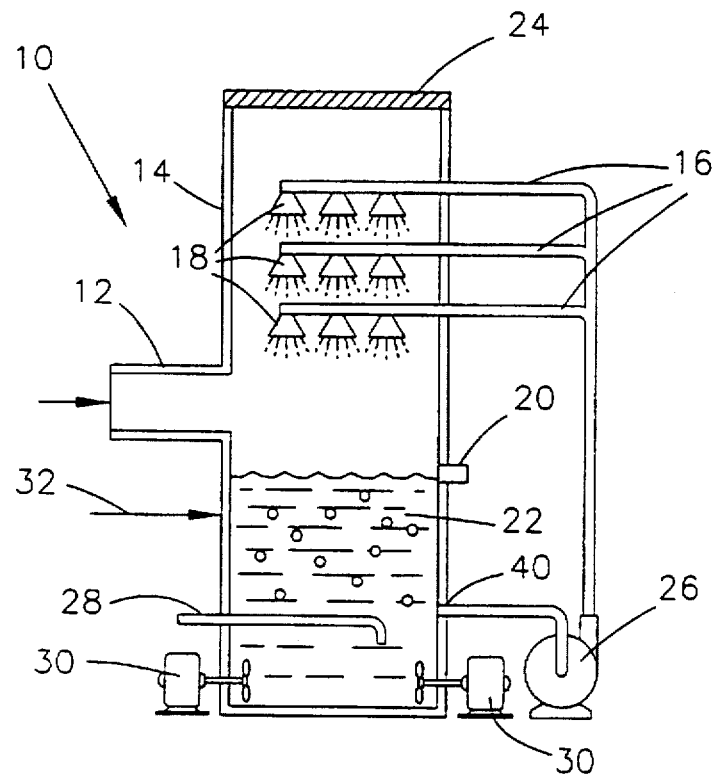
FIG. 1 shows in cross-section an absorber of a type known in the prior art.
Figure 2:
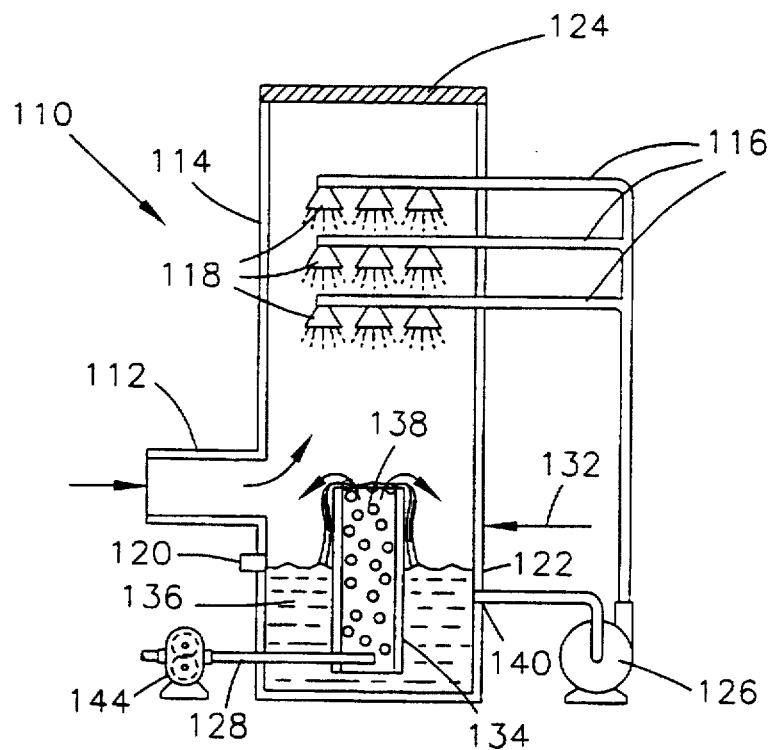
FIG. 2 shows in cross-section an absorber in accordance with a first embodiment of this invention.

FIG. 2 illustrates a flue gas scrubber in the form of an absorber 110 configured in accordance with the teachings of the present invention. As illustrated, the absorber 110 is generally similar to that of the prior art absorber 10 shown in FIG. 1, including a tank 122 in which a cleansing fluid used to absorb gases from flue gas is accumulated. However, in accordance with this invention, the absorber 110 includes an internal structure that enables the fluid to be oxidized and agitated within a limited region of the tank 122, and without the requirement for separate aeration and agitation devices, such as the aerator 28 and agitators 30 shown in FIG. 1. As a result, the construction, operational and maintenance costs of the absorber 10 are significantly reduced as compared to the prior art absorber 10. While the absorber 110 is illustrated as being of a particular construction, those skilled in the art will recognize that the teachings of this invention can be readily applied to various other structures that rely on agitation and oxidation of a cleansing fluid to remove undesirable gases, mist, dust, fumes, smoke and/or particulate matter from a volume of gas.

The absorber 110 shown in FIG. 2 generally has an upright structure composed of a spray tower 114. As illustrated, the tower 114 has an upper end, a lower end, and an inlet duct 112 which forms an opening at the perimeter of the tower 114 through which flue gases enter the absorber 110. The source of the flue gases may be a process involving the combustion of fossil fuels or various industrial operations by which undesirable gases and particulate matter are produced. The gas scrubbing operation occurs by contacting the flue gases with an appropriate cleansing fluid that will absorb the acidic gases and particulate matter in the flue gases. Afterwards, the flue gases are permitted to escape to atmosphere through a suitable mist eliminator 124 or any other suitable apparatus known in the art.

For purposes of removing acidic gases from flue gases, the cleansing fluid is typically an alkaline slurry. Wet flue gas desulfurization processes for removing sulfur dioxide from combustion gases typically involve the use of calcium-based slurries or sodium-based or ammonia-based solutions. Examples of calcium-based slurries are limestone slurries and hydrated lime slurries formed by action of water on lime. Intimate contact between the alkaline slurry and acidic gases present in the flue gases, such as sulfur dioxide, hydrogen chloride and hydrogen fluoride, results in the absorption of the gases by the slurry. Thereafter, the slurry can be oxidized to cause the alkali to react with the absorbed acidic gases to yield a useful byproduct. For example, in the case of desulfurization where a calcium-based alkaline slurry is used to absorb sulfur dioxide, an oxygen-containing gas such as air is injected into the fluid to oxidize aqueous sulfite ($SO_3^-$) into sulfate ($SO_4^-$), the latter of which will then react with calcium ions in the slurry to form gypsum ($CaSO_4$) as a saleable byproduct. As a result of this ongoing reaction, some gypsum inherently remains in suspension in the slurry, and is therefore recycled to the tower 114 along with the alkali solids. While the above reaction is exemplary, the teachings of this invention are not limited to the use of calcium-based slurries in a desulfurization reaction.

As shown in FIG. 2, the slurry can be delivered to the tower 114 by one or more banks 116 of spray headers 118. The spray headers 118 are designed to disperse a spray into the tower 114 that falls due to the force of gravity countercurrently to the upwardly flowing flue gases, such that fluid droplets entrap the particulate matter and absorb the acidic gases. While spray headers 118 are shown in FIG. 2, it is foreseeable that other types of devices could be used for introducing the slurry to the tower 114, including atomizers and trays. Furthermore, though FIG. 2 shows three banks 116 of spray headers 118, the number and placement of the banks 116 and spray headers 118 can be readily adapted to the design requirements of a particular application.

As also shown in FIG. 2, the absorber 110 includes a tank 122 at the lower end of the tower 114 in which the slurry is collected after contacting the flue gases in the tower 114. A pump 126 is fluidically interconnected through an inlet 140 with the tank 122, and serves to return the slurry to the spray headers 118. Also shown is an overflow duct 120 connected to the tank 122, which allows removal of slurry in excess of the amount required for the scrubbing operation. According to this invention, the tank 122 is uniquely adapted to oxidize and agitate the accumulated slurry in order to form a desired byproduct and maintain the solid precipitates in suspension within the tank 122. In particular, the tank 122 of this invention is equipped with a partition 134 that delineates an inner region 138 and an annular-shaped outer region 136 within the tank 122. As shown in FIG. 2, the partition 134 is centrally located in the tank 122, and has a tubular shape with a lower end being submerged in the slurry within the tank 22, while the upper end of the partition 134 projects above the surface of the slurry. Shown extending into the lower end of the inner region 138 is an injector 128 for injecting an oxygen-containing gas, such as air, into the slurry for causing forced oxidation of the slurry within the tank 122. As shown, air is delivered to the injector 128 by an aerator 144, represented here as a blower, though other types of aerators and injectors could be used, including spargers, air lanced agitators and aspirators. In the position shown, the partition 134 forms a physical barrier between the oxygen injected into the tank 122 and the inlet 140 to the pump 126. As such, there is a significantly reduced tendency for froth and bubbles produced by aeration to be drawn into the pump 126.

In contrast to the prior art use of a fan agitator emersed in the slurry, the present invention is able to rely solely on the introduction of the oxygen-containing gas into the inner region 138 of the tank 122 in order to maintain the solids in suspension and distribute and dissolve the oxygen in the slurry. As air is injected into the inner region 138, the slurry within the inner region 138 froths and expands, overflows the upper end of the partition 134, degasses, and then falls into the outer region 136. Once in the outer region 138, the slurry is eventually recirculated back to the inner region 138 by being drawn to the lower end of the partition 134. Advantageously, the slurry contained in the tank 122 is sufficiently agitated in this manner to insure that the solids in the slurry are maintained in suspension and oxygen is adequately distributed. However, the agitation level created in this manner is restricted to the inner region 138 of the partition 134, and therefore does not cause frothing and expansion of the slurry within the outer region 136 of the tank 122, as occurs with prior art systems. Consequently, because the capacity of the tank 122 required to accommodate frothing of the slurry is significantly reduced, the overall height of the absorber 110 can be reduced.

In operation, flue gases are introduced into the tower 114 through the inlet 112, while the alkaline slurry is introduced into the tower 114 through the spray headers 118 so as to flow countercurrently relative to the upwardly-flowing flue gases. Thereafter, the slurry is accumulated in the tank 122, where an oxygen-containing gas, such as air, is injected into the inner region 138 of the tank 122 formed by the partition 134. In doing so, the slurry absorbs the oxygen-containing gas and expands within the inner region 138, with the result that the slurry within the inner region 138 is forced up and over the partition 134, where it degasses before returning to the annular-shaped outer region 136 within the tank 122. The slurry within the tank 122 continues to recirculate in this manner, with a portion of the slurry being drawn by the pump 126 from the tank 122 and returned to the spray headers 118. Because frothing and bubbles formed by aeration are primarily limited to the inner region 138, bubbles are inhibited from being drawn into the pump 126 through the inlet 140. As gypsum is produced, a portion is removed for either disposal or sale, while additional alkali 132 is added to the tank 122 in order to compensate for that which has been reacted and removed as gypsum. In the position shown, the partition 134 also forms a physical barrier between the newly added alkali and the oxygen injected into the tank 122, thereby significantly reducing the tendency for sulfite binding to occur.

From the above, it can be appreciated that this invention uniquely combines the functions of agitation and oxidization within a single unit composed of the partition 134 and the aerator 144. This capability completely eliminates the capital and operating costs associated with operating a conventional aerator, such as the fan, and therefore reduces both the initial construction costs and the daily operation and maintenance costs of the absorber 110. Another advantage of the absorber 110 is that it provides a gentler agitation than in prior art spray towers. Gentler agitation reduces secondary nucleation of gypsum crystals, and therefore allows the crystals to grow larger than is possible with prior art agitators such as the fans shown in FIG. 1. As a result, the gypsum crystals can be dewatered and dried more easily.

Yet another advantage of this invention is that the aerator 144 injects the oxygen-containing gas only into the inner region 138 of the tank 122, rather than into the entire tank 122. As a result, the conventional requirement to allow for a considerable rise in the slurry height within the tank 122 is avoided, and the size of the tank 122 is correspondingly reduced. The partition 134 also advantageously serves as a barrier to prevent bubbles introduced through the aerator 144 from being drawn into the pump 126, and reduces the tendency of sulfite binding of newly added alkali.

Figure 3:
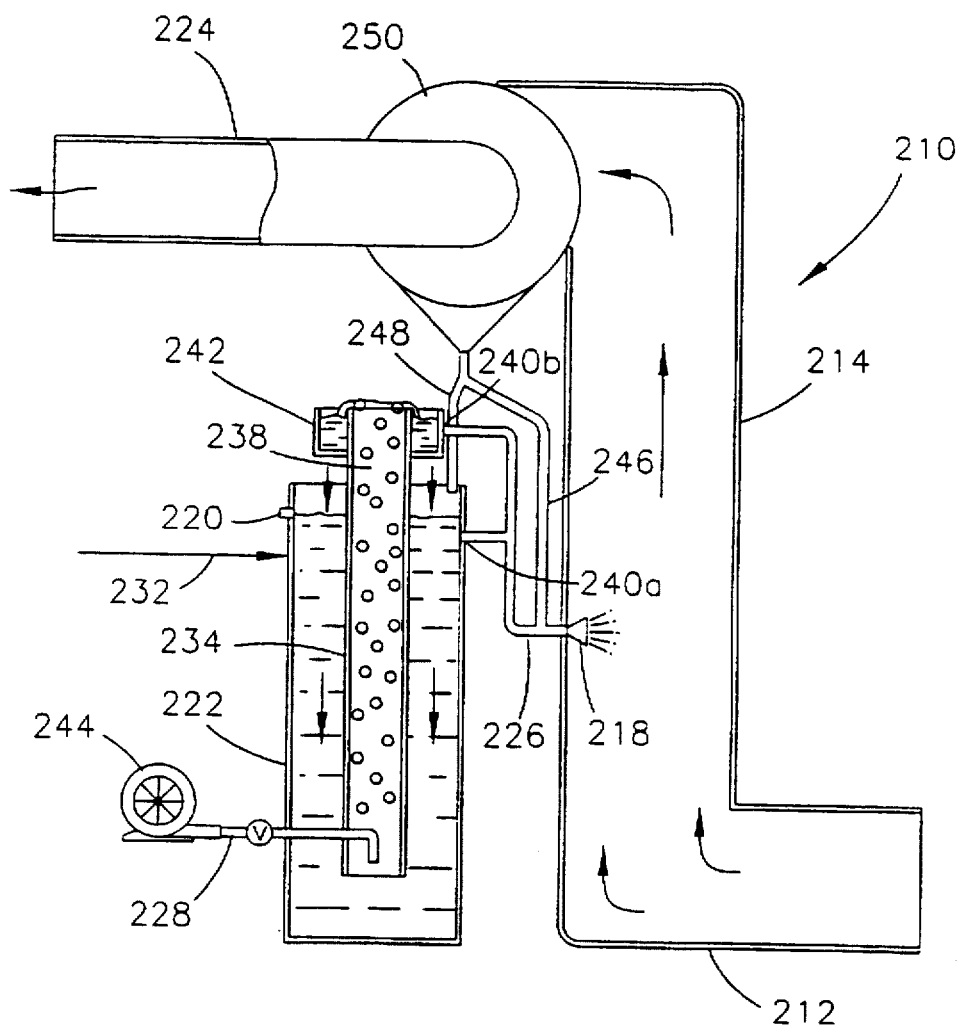
FIG. 3 shows in cross-section an absorber in accordance with a second embodiment of this invention.

FIG. 3 illustrates another flue gas scrubber in the form of an absorber 210 configured in accordance with the combined teachings of the present invention and that of co-pending and commonly assigned U.S. patent application Ser. No. 08/335,589 to Laslo. As illustrated, the absorber 210 significantly differs from the prior art absorber 10 shown in FIG. 1 and the absorber 110 of FIG. 2. Yet, in accordance with this invention, the absorber 210 encompasses the use of a partition 234 within which the slurry is oxidized and agitated solely through the operation of an aerator 244. Furthermore, the absorber 210 avoids the requirement for a pump to deliver the slurry to spray headers 218 within the gas-liquid contactor 214 of the absorber 210. As a result, the construction, operational and maintenance costs of the absorber 210 are even further reduced as compared to the prior art absorber 10.

As with the absorber 110 of FIG. 2, the absorber 210 shown in FIG. 3 generally has an upright structure composed of the gas-liquid contactor 214, with an inlet duct 212 at its lower end through which flue gases enter the absorber 210. Eventually, the flue gases are permitted to escape to atmosphere through a suitable mist eliminator 224 or any other suitable apparatus known in the art. As before, acidic gases are removed from the flue gases with a cleansing fluid, which may be alkaline such as a calcium-based slurry or a sodium or ammonia-based solution. As shown in FIG. 3, the fluid can be delivered to the contactor 214 through one or more spray headers 218 or other suitable devices.

As also shown in FIG. 3, the absorber 210 includes a separate tank 222 in which the fluid is collected after absorbing the flue gases in the contactor 214. In contrast to the countercurrent contact mode employed in the absorber 110 of FIG. 2, the absorber 210 of FIG. 3 operates with flue gases flowing at a much high velocity such that the cleansing fluid flows co-currently with the flue gases toward the upper end of the contactor 214. The fluid is recovered at the upper end of the contactor 214 with a disengagement device 250, such as the hydrocyclone shown or any other device capable of separating the fluid particles from the cleansed flue gas, such that the liquid particles fall out of the air stream and are eventually accumulated in the tank 222 via return line 248.

As before, an overflow duct 220 is connected to the tank 222, which allows removal of cleansing fluid in excess of the amount required for the scrubbing operation. According to this invention, the tank 222 is also equipped with a partition 234 that delineates an inner region 238 and an annular-shaped outer region 236 within the tank 222. As with the embodiment of FIG. 2, the partition 234 is centrally located in the tank 222, and an aerator 244 serves to inject air or another suitable oxygen-containing gas through a pipe 228 and into the fluid, causing forced oxidation of the fluid within the partition 234. In contrast to the previous embodiment, the fluid level within the tank 222 and partition 234 is at a greater elevation than the spray header 218. In addition, the partition 234 is equipped with an annular-shaped trough 242 that collects the fluid as it flows out and over the top of the partition 234. In effect, the trough 242 forms an integral portion of the inner region 238, though it is foreseeable that the trough 242 could be separate from the partition 234 and the inner region 238 to some extent. The trough 242 may be adapted to require the fluid to overflow its rim in order to return to the outer region 236 of the tank 222, or may be provided with openings along its sides and/or lower surface to allow passage of the fluid to the outer region 236.

A conduit 226, fluidically interconnected with the tank 222 through either of two inlets 240a and 240b, serves to return the slurry to the spray header 218 solely under the force of gravity. As shown, the inlet 240a interconnects with the tank 222 at an elevation a distance "X" above the spray header 218, while the inlet 240b interconnects with the trough 242 at an elevation a distance "X+Y" above the spray header 218. As such, the fluid will flow solely under the force of gravity to the spray header 218, rendering unnecessary the pump 126 shown in FIG. 2. Notably, a greater pressure head is achieved between the inlet 240b and the spray header 218 than between the inlet 240a and the spray header 218, achieving a higher flow rate to the spray header 218 through more efficient utilization of the energy required to operate the aerator 244. Flow through the conduit 226 can be regulated to draw fluid from either the trough 242 or the tank 222, or both simultaneously. Furthermore, a small portion of the fluid can bypass the tank 222 entirely and be returned directly to the spray header 118 through a second conduit 246 in order to provide dissolved alkalinity to the oxidized fluid being returned from the trough 242 or tank 222.

In addition to the additional benefits and features noted above, the absorber 210 represented in FIG. 3 has the same advantages as that described for the absorber 10 of FIG. 2.

While our invention has been described in terms of preferred embodiments, it is apparent that other forms could be adopted by one skilled in the art, such as by incorporating the novel features of this invention within flue gas absorbers that structurally differ from those shown in the Figures, and by altering the shape and construction of the partitions 134 and 234. Accordingly, the scope of our invention is to be limited only by the following claims.

What is claimed is:

1. A flue gas scrubbing method comprising the steps of:
   introducing flue gases comprising acidic gases into a passage;
   introducing an alkali-containing fluid into the passage such that the alkali-containing fluid removes the acidic gases from the flue gases;
   accumulating the alkali-containing fluid in a tank located below said passage, said tank being in open communication with the passage;
   injecting an oxygen-containing gas into the tank so as to cause the alkali-containing fluid to flow up through a first region structurally delineated within the tank and down into a second region structurally delineated within the tank, and so as to simultaneously expand, agitate and oxidize the alkali-containing fluid within the first region prior to flowing into the second region;
   after returning to the second region, recirculating a first portion of the alkali-containing fluid to the first region; and
   drawing a second portion of the alkali-containing fluid from the second region of the tank and returning the second portion of the alkali-containing fluid to the passage.

2. A method as recited in claim 1 wherein the alkali-containing fluid is circulated up through an inner region of the tank and down into an outer region surrounding the inner region.

3. A flue gas scrubbing method comprising the steps of:
   introducing flue gases comprising acidic gases into a passage;
   introducing an alkali-containing fluid into the passage such that the alkali-containing fluid removes the acidic gases from the flue gases;
   accumulating the alkali-containing fluid in a tank;
   injecting an oxygen-containing gas into the tank so as to cause the alkali-containing fluid to flow up through a first region structurally delineated within the tank and down into a second region structurally delineated within the tank, and so as to simultaneously expand, agitate and oxidize the alkali-containing fluid within the first region prior to flowing into the second region;
   after returning to the first region, recirculating a first portion of the alkali-containing fluid to the first region; and
   drawing a second portion of the alkali-containing fluid from the second region of the tank and returning the second portion of the alkali-containing fluid to the passage, wherein the second portion of the alkali-containing fluid is drawn from the second region of the tank at a first elevation that is above a second elevation at which the second portion of the alkali-containing fluid is introduced into the passage, such that the drawing step occurs solely under the influence of gravity to return the second portion of the alkali-containing fluid to the passage.

4. A method as recited in claim 3 further comprising the step of returning to the passage a portion of the alkali-containing fluid after the alkali-containing fluid has been introduced into the passage but prior to being accumulated in the tank.

5. A method as recited in claim 3 wherein the alkali-containing fluid flows co-currently with the flue gases through the passage.

6. A method as recited in claim 1 wherein the alkali-containing fluid flows counter-currently to the flue gases through the passage.

7. A method as recited in claim 1, wherein the alkali-containing fluid is accumulated from the passage in the second region of a tank.

* * * * *